3,294,770
PROCESS FOR THE POLYMERIZATION OF VINYL MONOMERS IN THE PRESENCE OF METAL ALCOHOLATES
Mario Ragazzini, Enzo Gallinella, and Giancarlo Borsini, Milan, Italy, assignors, by mesne assignments, to Edison, Milan, Italy, a corporation of Italy
No Drawing. Filed Mar. 18, 1963, Ser. No. 266,049
7 Claims. (Cl. 260—92.8)

The present invention relates to a polymerization process for vinyl monomers using particular catalytic systems.

According to the invention, the catalysts consist of compounds corresponding to the general formula

where Me stands for a metal of the 1st, 2nd or 3rd group of the periodic system, R and R' for alkyl radicals, either equal or differing from one another and straight-chain or branched, $x$ for a whole number varying from 1 to 3, $y$ for a whole number varying from 0 to 2, and $n$ for the valency of the metal, $x$ and $y$ being chosen in such a way as to satisfy the equation: $x+y=n$.

These compounds are generally described in the literature (1) V. Grosso, M. Mavity, J. Org. Chem. 5, 106–21 (1940); L. I. Zekharin, L. A. Savina, Izvest. Akad. Nauk S.S.S.R., Otdel. Khim. Nauk 1959 444–9; S. Coffey, V. Boyd, J. Chem. Soc. 1954, 2468–70; Z. M. Dekenova, Ys. A. Mandelbaum, N. H. Mol'nikov, S. I. Sventsitskii, Zhur. Obshchei Khim. 26, 494–95 (1956); W. R. Vaughan, M. V. Andersen, Jr., H. S. Blanchard, D. I. McCane, V. L. Meyer, J. Org. Chem. 20, 819–22 (1955); E. Bonits, Ber. 88, 742 (1955); M. Farina, M. Donati, M. Ragazzini, Ann. Chim. 48, 501 (1958).

It is known that polyvinyl chloride, hereinafter called PVC, obtained with the usual polymerization processes, possesses a substantially amorphous nature, due to:

(a) The asymmetry derived from the disordered repetition of dextro- and levo-structural units along the polymer chain;
(b) The asymmetry depending on the probable presence of a certain percentage of head-to-head, tail-to-tail bonds in a chain of head-to-tail structure;
(c) The asymmetry due to carbon atoms of higher functionality, which leads to the formation of branched chains.

The commonest causes of non-linearity in vinyl chloride polymerization are the non-proportional reactions between a radical chain and the monomer and the "chain transfer" processes with either the monomer or previously formed polymer, on account of which the point of attack is displaced either on the substituent, which thus enters to form part of the polymer chain, or on the tertiary carbon atom with removal of the hydrogen.

The use of catalyst systems according to the present invention offers interesting aspects with regard to normal polymerization processes for vinyl monomers, for instance, vinyl chloride.

Properties of PVC obtained with the process according to the present invention, in particular, polymerizing at low temperature, or with alcoholates of elements of the 3rd group of the periodic system, are the high molecular weight ($[\eta]=1.5–2$), the high linearity of the polymer chain, and the tendency to a preferential arrangement of the dextro- and levo-asymmetric units along the polymer chain. This preferential arrangement is observable when carrying out infrared analysis of the polymer, the I.R. spectrum of which reveals the two bands referrable to a syndyotactic arrangement of the monomer units, much more evident for the PVC object of the present invention than for normal PVC, and precisely corresponding to cm.$^{-1}$=603 and 635. Considering the ratio $D_{635}/D_{693}$, S. Krimm et al., Chim. & Ind. 84 (1959), 433; Sumi. N. e Imoto, M., Makromolekulare Chem. 50 (1961), 161; in which $D_{635}$ is the intensity of absorption of the C—Cl bond in the syndyotactic fraction and $D_{693}$ is the intensity of absorption of the same bond in the non-syndyotactic fraction, it is possible to obtain values relative to the percentage of syndyotactic in the polymer. Such values are much higher for PVC obtained with the catalysts in question, than for normal PVC, and are precisely around a value of approximately 1.9–2.2 while, in the case of normal PVC, they are around a value of 1.5.

This corresponds to greater crystalline structure of the polymer, a higher softening temperature and improvement of the mechanical properties of said PVC in comparison with that obtained from normal polymerization with peroxides.

The activity of this particular class of catalysts is exerted in a wide temperature interval ranging from $-100°$ C. to $+100°$ C., and, in particular, from $-80°$ C. to $+50°$ C.

Moreover, it is interesting to observe the increase in molecular weight of polymer obtained on passing from alcoholates of elements of the 1st and 2nd group of the periodic system to alcoholates of elements of the 3rd group.

The process of polymerization according to the invention may be carried out in mass or in inert solvents such as, for instance, saturated hydrocarbons and in polar solvents such as ethers, chloroform, etc.

The following examples explain in greater detail the process and object of this invention and therefore cannot be considered as limiting the invention itself.

*Example No. 1*

2 g. of $Al(C_2H_5)_3$ were placed in a glass flask, equipped with stirrer, thermometer and air vent, brought to $-40°$ C., and kept in a current of nitrogen. 1.5 ml. of n-butyl alcohol were then added, in order to obtain

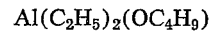

The temperature was then slowly allowed to rise, carefully controlling the moment when the bubbles of gas begin to appear and then the temperature was allowed to reach $+40°$ C.

The mixture was then cooled to $-65°$ C. and 150 ml. of vinyl chloride were allowed to condense in the flask. The mixture was then stirred, keeping the bath at $-65°$ C. for 5 hours, and finally the catalyst was destroyed with gaseous HCl. The residual vinyl chloride monomer was discharged, leaving the air-vent open. and the precipitate treated with warm concentrated HCl and then diluting with water, filtering, washing and drying. 50 g. of dry polymer were obtained which were further purified by dissolving in warm cyclohexanone, and pouring the solution in excess of methyl alcohol. The solution was filtered and dried at 50° C. under vacuum. Analysis of the elements of the polymer corresponded to that for a normal PVC, while I.R. analysis showed a syndyotactic index equivalent to 2.1; the intrinsic viscosity $[\eta]$ at 25° C. in cyclohexanone is 1.60.

*Example No. 2*

0.35 g. of $Al(C_2H_5)_2(OC_4H_9)$ prepared as in Example 1, and 10 g. of vinyl chloride were placed in a glass ampoule at −50° C., in a current of nitrogen. The ampoule was sealed on a flame and shaken at room temperature. After five hours the ampoule was cooled in Dry Ice and the remainder of the catalyst destroyed with water. The polymer so obtained was treated with concentrated HCl, washed and filtered. The product was dissolved in cyclohexanone and precipitated with excess methyl alcohol. 4 g. of dry polymer were obtained. Syndyotactic index=2; $[\eta]=1.55$.

*Example No. 3*

10 g. of n-heptane, 0.35 g. of $Al(OC_4H_9)(C_2H_5)_2$ and 10 g. of vinyl chloride were placed in a glass ampoule and kept at room temperature for 5 hours. Proceeding as above, 3.7 g. of polymer are obtained. Syndyotactic index=1.9; $[\eta]=1.5$.

*Example No. 4*

0.5 g. of $Al(OC_4H_9)_2(C_2H_5)$ (obtained by mixing 2 g. of $Al(C_2H_5)_3$ with 2.16 g. of n-butyl alcohol at low temperature and then letting the temperature gradually rise to 40° C., leaving to stand overnight) were mixed with 10 g. of vinyl chloride monomer in a glass ampoule under nitrogen and at −50° C. After 5 hours reaction the vinyl chloride was evaporated, the polymer treated with HCl, washed with methyl alcohol, reprecipitated from a cyclohexanone solution and dried. Syndyotactic index=1.9; $[\eta]=1.7$.

*Example No. 5*

As $Al(OCH_4H_9)_3$ is solid, it was prepared directly in the ampoule by mixing at low temperature, and in a stream of nitrogen, 0.2 g. of $AlEt_3$ and 0.4 g. of n-butyl alcohol. The temperature was allowed to rise gradually, and was then brought to 40° C., the ampoule was left to rest for two days, and then 10 ml. of vinyl chloride are added. The ampoule was sealed on the flame, and shaken for 5 hours at room temperature. 4 g. of polymer were obtained. Syndyotactic index=1.9; $[\eta]=2.05$.

*Example No. 6*

The catalyst, LiOBu, was prepared directly in the ampoule, allowing 2 ml. of a solution in heptane of LiBu 6 N to react with 0.9 g. of n-butyl alcohol. 10 g. of vinyl chloride monomer are then condensed, the ampoule was sealed on the flame, and shaken at room temperature for 5 hours. 1.6 g. of polymer were obtained. Syndyotactic index =2; $[\eta]=1.64$.

*Example No. 7*

0.35 ml. of $Al(C_2H_5)_2(OC_4H_9)$ and 10 g. of vinyl chloride were placed in a glass ampoule, in a stream of nitrogen, at −50° C. The ampoule was sealed on the flame and shaken in a thermostatically controlled bath at +50° C. After 5 hours, the ampoule was cooled in Dry Ice, the remainder of the catalyst was destroyed with water and the polymer obtained boiled with HCl and washed with water, filtered, dried and dissolved in cyclohexanone and then precipitated with methyl alcohol. 4.5 g. of dry polymer were obtained. Syndyotactic index=2.1; $[\eta]=1.45$.

*Example No. 8*

10 g. of n-heptane, 0.35 g. of $Al(OC_4H_9)(C_2H_5)_2$ and 10 g. of vinyl chloride were placed in a glass ampoule in the same conditions used for the previous example, the ampoule was sealed on the flame, and shaken in a thermostatically controlled bath at +50° C., for 5 hours. 4.2 g. of polymer ($[\eta]=1$) are obtained.

*Example No. 9*

10 g. of ethyl ether, 0.35 g. of $Al(OC_4H_9)(C_2H_5)_2$, 10 g. of vinyl chloride were placed in a glass ampoule in the same conditions used for the previous example, the ampoule was sealed on the flame, and shaken in a thermostatically controlled bath at +50° C. for 5 hours. 4.5 g. of polymer were obtained. Syndyotactic index =2.1; $[\eta]=1.05$.

*Example No. 10*

The catalyst $Al(C_4H_9O)_3$ was prepared directly in the ampoule, with the same method reported in Example No. 5. 10 g. of vinyl chloride polymer were added, the ampoule was sealed, and the substances were allowed to react at 50° C., with shaking. 4.5 g. of polymer were obtained. $[\eta]=0.97$.

*Example No. 11*

The catalyst used, $Al(OC_2H_5)(C_2H_5)_2$, was prepared with a technique similar to that used for the previous examples; mixing 0.4 g. of $Al(C_2H_5)_3$ and 0.16 g. of $C_2H_5OH$ at −40° C., and in a stream of nitrogen, then returning to room temperature. Polymerization occurred as in the previous examples and 3 g. of polymer were obtained. Syndyotactic index=0.90; $[\eta]=1.95$.

*Example No. 12*

The catalyst used, LiOBu, was prepared directly in the ampoule as in the case of Example No. 6. 10 g. of vinyl chloride were then added to the ampoule which was sealed on the flame and polymerization allowed to take place at 50° C., for 5 hours, 2 g. of polymer were obtained.

*Example No. 13*

The catalyst used, LiOBu, was prepared directly in the ampoule, allowing metallic lithium to react with excess butyl alcohol, and heating gently to start the reaction. The ampoule, brought to −40° C., was then filled with 10 g. of vinyl chloride, and was sealed on the flame and then placed in a bath, thermostatically controlled at +50° C., for 5 hours. 1.5 g. of low polymers, partly oily and partly waxy, were obtained and these are purified by treating with warm HCl and washing in methyl alcohol. Analysis of the elements of the product corresponds to normal PVC.

*Example No. 14*

The catalyst, $Mg(OC_3H_7)(C_4H_9)$, was prepared directly in the ampoule, allowing 0.5 g. of $Mg(C_4H_9)_2$ and 0.20 g. of propyl alcohol to react at −40° C. in a current of nitrogen. The temperature was gradually raised to +40° C., and the ampoule left to stand for 12 hours, after which the temperature was reduced to −40° C. and 10 g. of vinyl chloride were added. The ampoule was sealed on the flame and polymerized at room temperature, with shaking. 2.3 g. of polymer were obtained.

What is claimed is:

1. Process for the polymerization of vinyl chloride, in mass, in the presence of inert solvents or in the presence of polar solvents, in order to obtain polyvinyl chlorides with a high syndyotactic index which comprises polymerizing vinyl chloride in the presence of a catalyst selected from the class consisting of the mono- and dialcoholates of aluminum alkyl, the tri-alcoholates of aluminum, the alkyl alcoholate of magnesium, the dialcoholates of magnesium and the alcoholates of lithium.

2. Process according to claim 1, wherein the catalyst used is diethyl aluminum monobutylate.

3. Process according to claim 1, wherein the catalyst used is monoethyl aluminum dibutylate.

4. Process according to claim 1, wherein the catalyst used is aluminum tributylate.

5. Process according to claim 1, wherein the catalyst used is lithium butylate.

6. Process according to claim 1, wherein the catalyst used is diethyl aluminum monoethylate.

7. Process according to claim 1, wherein the catalyst used is buty magnesium propylate.

References Cited by the Examiner

UNITED STATES PATENTS

| | | | |
|---|---|---|---|
| 2,608,554 | 8/1952 | Bullitt | 260—88.7 |
| 2,641,604 | 6/1953 | Le Maistre et al. | 260—448 |
| 2,948,712 | 8/1960 | Coover | 260—92.8 |
| 2,970,977 | 2/1961 | Sunden et al. | 260—88.7 |
| 3,068,263 | 12/1962 | Smith | 260—448 |
| 3,088,939 | 5/1963 | Miller | 260—88.7 |
| 3,098,060 | 7/1963 | Miller | 260—88.7 |
| 3,141,007 | 7/1964 | Rinse | 260—89.5 |

OTHER REFERENCES

Gaylord et al.: Linear and Stereoregular Addition Polymers, Interscience Publishers, Inc., New York (1959), p. 527. (Copy in Group 140.)

JOSEPH L. SCHOFER, *Primary Examiner.*

DONALD E. CZAJA, *Examiner.*

H. WONG, *Assistant Examiner.*